(12) United States Patent
Lawton

(10) Patent No.: US 6,721,732 B2
(45) Date of Patent: Apr. 13, 2004

(54) METHOD AND SYSTEM FOR PRE-FILLING SEARCH CRITERIA INTO A FORM

(76) Inventor: Scott S. Lawton, 24 Colonial Dr., Chelmsford, MA (US) 01824

(*) Notice: Subject to any disclaimer, the term of this patent is extended or adjusted under 35 U.S.C. 154(b) by 254 days.

(21) Appl. No.: 09/969,542

(22) Filed: Oct. 2, 2001

(65) Prior Publication Data

US 2002/0087527 A1 Jul. 4, 2002

Related U.S. Application Data

(60) Provisional application No. 60/237,243, filed on Oct. 2, 2000, provisional application No. 60/237,249, filed on Oct. 2, 2000, provisional application No. 60/237,250, filed on Oct. 2, 2000, provisional application No. 60/237,252, filed on Oct. 2, 2000, provisional application No. 60/237,254, filed on Oct. 2, 2000, provisional application No. 60/238,577, filed on Oct. 6, 2000, provisional application No. 60/238,587, filed on Oct. 6, 2000, provisional application No. 60/238,754, filed on Oct. 6, 2000, and provisional application No. 60/238,791, filed on Oct. 6, 2000.

(51) Int. Cl.[7] .............................................. G06F 17/30
(52) U.S. Cl. ................................. 707/3; 707/1; 707/4
(58) Field of Search ...................................... 707/1, 3, 4

(56) References Cited

U.S. PATENT DOCUMENTS 6,411,698 B1 * 6/2002 Bauer et al. ........... 379/207.01
2003/0037232 A1 * 2/2003 Bailiff ........................ 713/153

* cited by examiner

Primary Examiner—Charles Rones
(74) Attorney, Agent, or Firm—Kevin A. Oliver; Foley Hoag LLP

(57) ABSTRACT

A method and system for automatically saving a user's search criteria and pre-filling the search criteria into the search form on the user's next visit. The invention saves the user from having to remember exactly what search criteria was previously entered, or from having to reenter that search criteria, or from having to explicitly store and recall that search criteria.

17 Claims, 4 Drawing Sheets

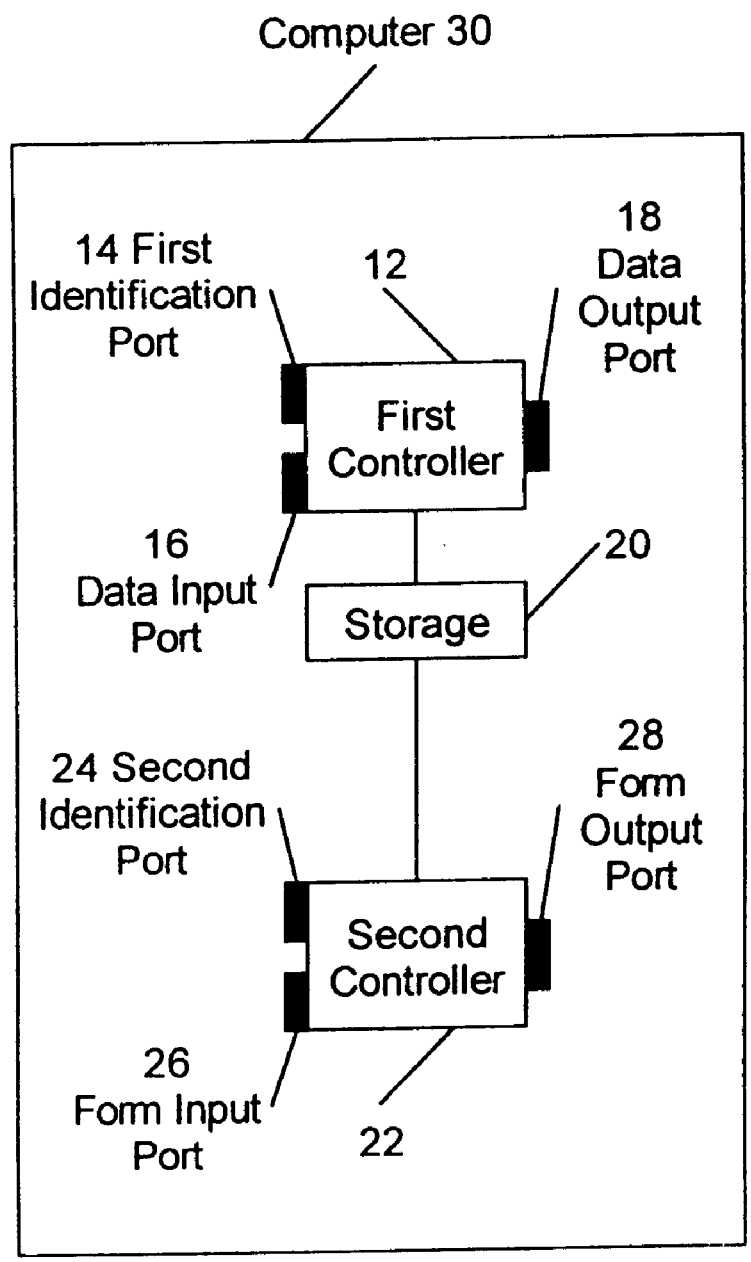

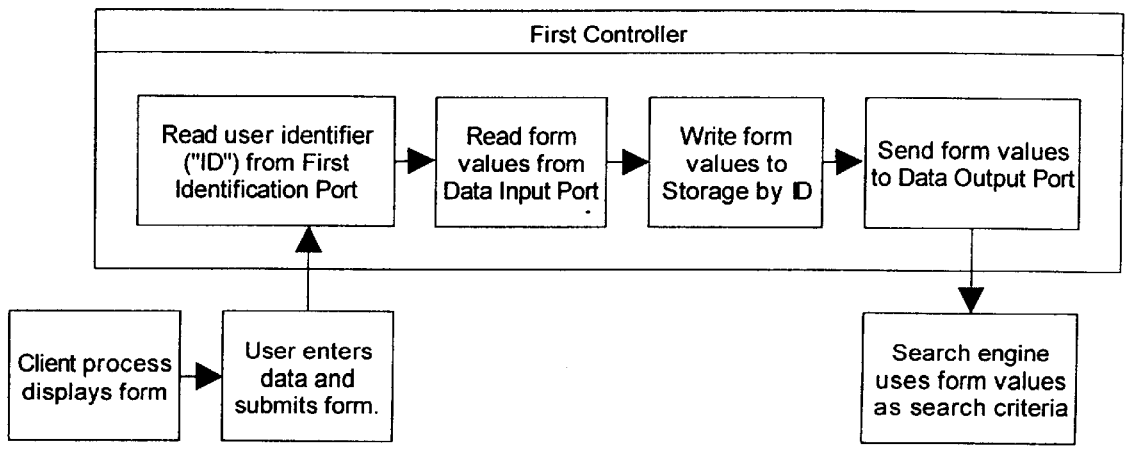
Figure 2a: Flow Chart for Form Submission
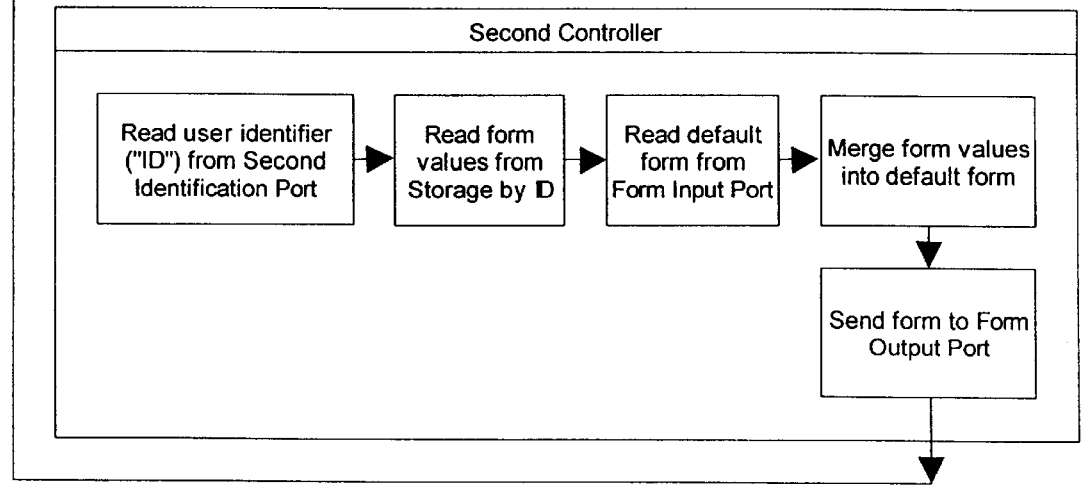
Figure 2b: Flow Chart for Next Visit

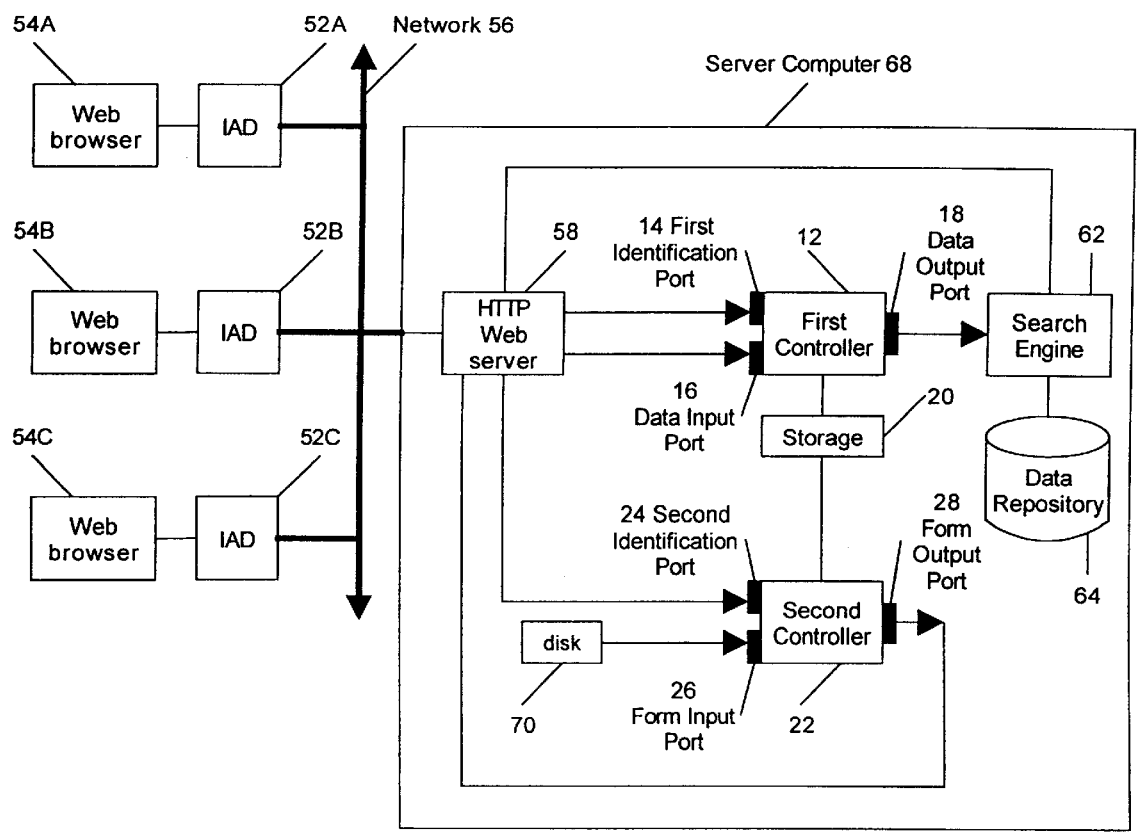
Figure 3: System 50

Figure 4: System 90
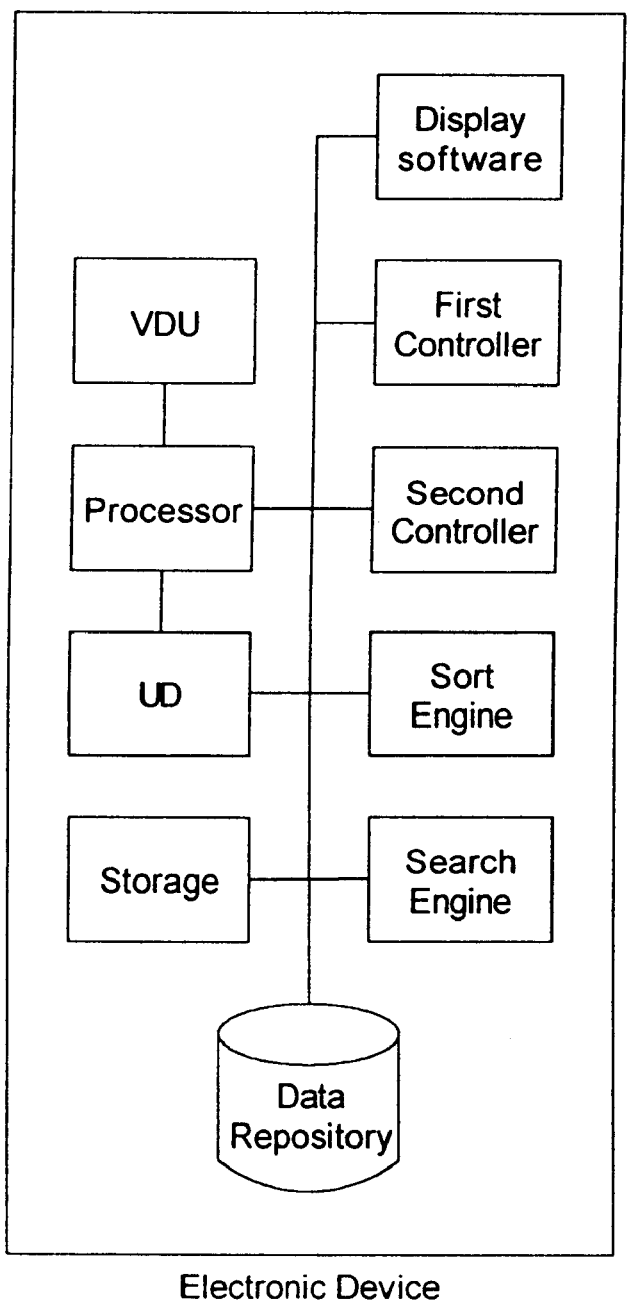
Electronic Device

METHOD AND SYSTEM FOR PRE-FILLING SEARCH CRITERIA INTO A FORM

REFERENCE TO RELATED APPLICATIONS

This application claims the benefit of and incorporates by reference the following applications:

U.S. Provisional Application Serial No. 60/237,249 filed Oct. 2, 2000; Method and System of Entering Search Criteria Using Multiple Entry Fields per Data Element, U.S. Ser. No. 60/238,577 filed Oct. 6, 2000; Method and System for Combining User-Supplied Sort Information with Secondary Sort Information, U.S. Ser. No. 60/238,791 filed Oct. 6, 2000; Method and System for Organizing Information into Visually Distinct Groups Based on User Input, U.S. Ser. No. 60/238,587 filed Oct. 6, 2000; Enhanced Method and System for Viewing Any Search Result Without Returning to the Result List, U.S. Ser. No. 60/238,754 filed Oct. 6, 2000; Enhanced Method and System for Storing and Managing Search Criteria, U.S. Ser. No. 60/237,254 filed Oct. 2, 2000; Method and System for Modifying Search Criteria Based on Previous Search Date, U.S. Ser. No. 60/237,243 filed Oct. 2, 2000; and Method and System for Organizing Search Results into a Single Page Showing Two Levels of Detail, U.S. Ser. No. 60/237,252 filed Oct. 2, 2000.

COPYRIGHT NOTICE

The following patent disclosure includes material that is subject to copyright protection. The copyright owner has no objection to the facsimile reproduction of the disclosure by any person as it appears in the records of the U.S. Patent and Trademark Office, but otherwise reserves all rights to the copyright whatsoever.

FIELD OF THE INVENTION

The invention relates generally to information retrieval from data repositories, and more particularly to a method and system for pre-filling search criteria from the prior visit into a search form, whereby the user does not need to remember or reenter previous values or actively store them.

BACKGROUND OF THE INVENTION

As a society, we are increasingly becoming both dependent on and overloaded with information, especially data that is stored in computer databases or full-text collections. As the quantity of information stored in these data repositories increases, the complexity of retrieving relevant information also increases. To locate information, users search general collections (e.g., AltaVista, Excite, InfoSeek, Lycos, Yahoo, etc.) as well as specialized sources which may be implemented with back-end databases, such as those dedicated to locating employment opportunities (e.g., CareerBuilder, CareerPath, Headhunter.net, HotJobs, Monster.com, etc.). According to recent studies from technology analysts (e.g., the Jupiter Group and Forrester Research), Internet searching is the most common online activity next to sending/receiving e-mail communications.

Data repositories may take on several forms, including relational databases, hierarchical databases, and flat-file databases, all of which support and may require searching within specific fields or columns, full-text collections which may or may not support searching within fields or delimited portions of documents that are represented as fields, and/or one or more documents. As used herein, the term "data element" refers to a database field, a delimited portion of a document, meta information associated with a document, or to an entire document. As used herein, the term "data object" refers to a database record, a document, or some other grouping of associated data elements. As used herein, the term "data unit" refers to the value or contents of a data element. As used herein, the term "page" refers to a document or page on the World Wide Wide or other public or private network, e.g. a continuously scrollable body of information which may or may not include so-called "frames," (i.e. portions that do not scroll automatically when other portions of the page are scrolled).

Although many searches are "ad hoc," using completely different search criteria for each visit, other searches are likely to use similar or even identical search criteria on subsequent visits. Examples include searching job openings, resumes of job seekers, apartments for rent, houses for sale, etc. Most search Web sites force users to enter search criteria from scratch each time, wasting time and increasing frustration.

To address these problems, some search Web sites let you save search criteria by name and recall the named search criteria in a subsequent visit. While this approach is useful when users have multiple sets of search criteria, it still requires that the user explicitly save the search at one point, and explicitly invoke the named search on a subsequent visit—which in turn usually requires visiting a page other than the usual search page.

In summary, the prior art does not provide a way for multiple search terms to be saved and recalled automatically, forcing users to spend additional time and energy providing or selecting search criteria.

SUMMARY OF THE INVENTION

In the present invention, a computer with appropriate software automatically saves a user's search criteria and pre-fills the search criteria into the search form on the user's next visit.

The present invention overcomes the prior art limitations by automatically saving and recalling a user's search criteria.

It is an object of the invention to reduce the time and frustration associated with repeated searches, by saving the user from having to remember exactly what search criteria was previously entered, or from having to reenter that search criteria, or from having to explicitly store and recall that search criteria.

Other objects and advantages of the invention will, in part, be obvious, and, in part, be shown from the following description.

BRIEF DESCRIPTION OF THE DRAWINGS

FIG. 1 is a schematic representation depicting the components of one embodiment of the invention;

FIGS. 2a and 2b are flow charts depicting the steps for a form submission and the user's next visit;

FIG. 3 is a schematic representation depicting one illustrative embodiment of the invention, wherein the invention is coupled to a network;

FIG. 4 is a schematic representation depicting one illustrative embodiment of the invention, wherein the invention interacts with a single electronic device.

LIST OF REFERENCE NUMERALS

10 system components
12 first controller 14 first identification port
16 data input port
18 data output port
20 storage
22 second controller
24 second identification port
26 form input port
28 form output port
30 computer
50 system with network
52A–52C IADs
54A–54C Web browsers
56 network
58 HTTP Web server
62 search engine
64 data repository
68 server computer
70 disk
90 system with single electronic device

DESCRIPTION OF THE ILLUSTRATIVE EMBODIMENTS

To provide an overall understanding of the invention, certain illustrative embodiments will now be described. However, it will be understood by one of ordinary skill in the art that the methods and systems described herein may be adapted and modified for other suitable applications and that such other additions and modifications will not depart from the spirit and scope of the inventive concept.

To more clearly and concisely describe the subject matter of the invention, the following definitions are intended to provide guidance as to the meaning of specific terms used in the following written description, examples, and appended claims. As used herein, the term or phrase:

"communications network" and "network" include a LAN, a MAN, a WAN, an Intranet, an Extranet, the Internet, a wireless network (e.g., according to the WAP protocol), and the like;

t"Information Location Mechanism" (hereinafter "ILM") includes software, firmware and/or systems capable of searching a data repository to locate information that meets search criteria, such systems including database management systems, search engines supporting full-text search, search engines supporting fielded search, search engines supporting regular expressions and/or other patterns, and/or iterative search engines;

"Information Sorting Mechanism" (hereinafter "ISM") includes software, firmware and/or systems capable of ordering data objects according to sort criteria, such systems including database management systems, text processing library routines, etc.;

"Internet Access Device" (hereinafter "IAD") includes personal computer systems (hereinafter "PCs"), computer workstations, desktop computers, laptop computers, hand-held computers, television set-top boxes, wireless access devices such as mobile telephones, cellular telephones, pagers, beepers, and other various hand-held wireless devices, and all other devices that have at least one processor, UD and VDU, and are capable of accessing the Internet and/or other networks;

"processor" includes all components, devices, Integrated Circuits (hereinafter "ICs"), modules, software, subsystems, and/or systems that provide control and/or perform arithmetic and logical operations and/or extract computer instructions and/or decode computer instructions and/or execute computer instructions, such as a Central Processing Unit (hereinafter "CPU"), a microprocessor, a controller, and the like; including any associated memory or other electronic storage of data and/or instructions;

"User-input Device" (hereinafter "UD") includes keyboards, keypads, mice, trackballs, trackpads, wheels, joysticks, graphics tablets, voice recognition devices, motion sensing devices and other devices for one or more users to enter text, numbers or other data and/or for pointing, clicking, tapping, selecting, dragging and/or other gestures or actions;

"Visual Display Unit" (hereinafter "VDU") includes CRT screens, monitors, video display terminals, LCD screens, LED screens, digital paper, and all other devices that are capable of displaying analog or digital data;

FIG. 1 depicts an illustrative embodiment of one system 10 according to the invention which pre-fills search criteria into a search form. The system comprises a first controller 12 containing a first identification port 14, a data input port 16 and a data output port 18. The first controller 12 is coupled with storage 20, which is in turn coupled with a second controller 22 containing a second identification port 24, a form input port 26 and a form output port 28.

For this illustrative embodiment, the first controller 12 with ports 14, 16 and 18, the storage 20 and the second controller 22 with ports 24, 26 and 28 reside on a single computer 30 which may be a Macintosh G3 running MacOS 8.5. For this illustrative embodiment, the first controller 12 and the second controller 22 are coded in the UserTalk language embedded in UserLand Frontier, a commercial scripting and Web development system. For this illustrative embodiment, storage 20 is an object database in UserLand Frontier.

It will be readily apparent to those skilled in the art that the computer 30 could be a different Macintosh computer running a different version of MacOS or a different OS such as Linux, or an Intel or Intel-compatible PC or server running a version of the Microsoft Windows operating system such as Windows 98, Windows NT or Windows 2000, or an Intel or Intelcompatible PC or server running Linux or FreeBSD or other UNIX OS, or a computer from Sun, HP, IBM or other company, running Solaris, HP-UX, AIX or other variation of UNIX or other OS.

It will be readily apparent to those skilled in the art that the functions performed in this embodiment with a single computer 30 could be divided among a plurality of computers from the same or different manufacturers, with each computer running the same or different operating systems.

It will be readily apparent to those skilled in the art that first controller 12 and/or second controller 22 could be coded in any suitable scripting or programming language such as Perl, JavaScript, Java, VBScript, Visual BASIC, C++, etc. or any suitable Web development system such as Vignette StoryServer, Allaire ColdFusion, SilverStream, etc., and that first controller 12 and second controller 22 need not be coded in the same language or system.

It will be readily apparent to those skilled in the art that storage 20 could be implemented with a file or files stored on a computer-readable medium, with a database management system, or using other well-known storage techniques.

Operation

FIG. 2a is a flow chart that depicts one sequence of operation for this illustrative embodiment. Initially, a client process displays a search form to the user, whereupon the user enters data and submits the form. First controller 12 receives the user identifier ("ID") from identification port 14 and the form values from data input port 16, writes the form values to storage by ID then sends the form values to data output port 18 for subsequent use as search criteria for a search engine.

FIG. 4b is a flow chart that depicts a second sequence of operation for this illustrative embodiment. When the user returns for their next visit, second controller 22 receives the identifier list from identification port 24, reads the previously saved form values from storage by ID, reads the default form from form input port 26, merges the form values into the default form then sends the merged form to form output port 28 for subsequent display on the client process.

It will be readily apparent to those skilled in the art that the same result could be accomplished with variations on these two sequences, such as reading form values prior to the ID or reading the default form prior to the ID. It will be further apparent that first controller 12 and second controller 22 could accept and process information in a variety of formats, each of which may differ from the other.

It will be readily apparent to those skilled in the art that the initial default form could have been displayed directly without accessing either controller, or that the second controller 22 could return the default form when there is no ID or when there is no form values stored by a given ID.

Alternative Embodiments

FIG. 3 depicts another illustrative embodiment of one system 50 according to the invention which displays the form and receives search criteria over a network. The system comprises a plurality of IADs 52A–52C, each integrated with or coupled to a client process such as a Web browser 54A–54C and coupled to a network 56, which is in turn coupled to an HTTP Web server 58, which is coupled to the first controller 12 via identification port 14 and via data input port 16. The first controller 12 is coupled via data output port 18 to search engine 62, which is in turn coupled to data repository 64 and to HTTP Web server 58 in order to return the search result to the IADs 52A–52C to display for the users on client processes such as Web browsers 54A–54C.

The first controller 12 is coupled with storage 20, which is in turn coupled with a second controller 22 containing a second identification port 24 which is coupled to HTTP Web server 58, a form input port 26 which is coupled to disk 70 and a form output port 28 which is coupled to HTTP Web server 58 in order to return the search form to the IADs 52A–52C to display for the users on client processes such as Web browsers 54A–54C.

For this illustrative embodiment, the HTTP Web server 58, search engine 62, data repository 64, first controller 12 with ports 14, 16 and 18, storage 20, second controller 22 with ports 24, 26 and 28, and disk 70 reside on a single server computer 68.

It will be readily apparent to those skilled in the art that the functions performed in this embodiment with a single server computer 68 could be divided among a plurality of server computers from the same or different manufacturers, with each computer running the same or different operating systems.

It will be readily apparent to those skilled in the art that the HTTP Web server 58 could be WebStar, WebTen, Microsoft IIS, Apache or other commercial or open source Web server or Web development system, such as UserLand Frontier, which includes a built-in Web server. It will be readily apparent to those skilled in the art that first controller 12, second controller 22, and other components could interact with HTTP Web server 58 via CGI, plug-in, servlets, Enterprise Java Beans, etc.

It will be readily apparent to those skilled in the art that search engine 62 and data repository 64 could be any suitable database management system such as Oracle, Informix, Sybase, SQL Server, Access, mySQL, PostgreSQL, etc. or full-text search engine and associated collection or other index mechanism such as those provided by Verity, UltraSeek, Thunderstone, etc., and/or other software capable of storing and searching data. It will be further apparent that search engine 62 and data repository 64 need not be implemented using the same software nor even reside on the same computer.

Operation: The user controls one or more UDs to enter and/or select search criteria in an HTML form via a Web browser 54 running on an IAD 52. The Web browser 54 sends the criteria over the network 56 via the HTTP protocol to the HTTP Web server 58 running on the server computer 68, which forwards the search criteria to data input port 16 of first controller 12, and forwards a user identifier ("ID") to identification port 14 of first controller 12. First controller 12 writes the search criteria to storage by ID then sends the search criteria via data output port 18 to search engine 62. Search engine 62 searches data repository 64 and returns matching data to HTTP Web server 58, which returns the HTML page over the network 56 via the HTTP protocol back to the user's Web browser 54 which displays it on the VDU of IAD 52.

When the user returns for their next visit and requests the search form from HTTP Web server 58 via Web browser 54 running on an IAD 52, second controller 22 receives the identifier list from HTTP Web server 58 via identification port 24, reads the previously saved form values from storage by ID, reads the default form from form input port 26, merges the form values into the default form then sends the merged form via form output port 28 to HTTP Web server 58, which returns the HTML form over the network 56 via the HTTP protocol back to the user's Web browser 54 which displays it on the VDU of IAD 52.

FIG. 4 depicts an illustrative embodiment of one system 90 according to the invention. The system comprises a single electronic device with at least one processor, at least one UD, at least one VDU and some form of storage, with the system 90 running software configured as one or more components to display a search form, accept user input, store the user input using first controller 12, perform a search on a local or embedded data repository, sort the results, return the results to the user, accept a form request on a subsequent visit, read previously stored values using second controller 22, merge stored values into the form and display the form for the user.

It will be readily apparent to those skilled in the art that, as depicted in FIG. 6, the first controller 12 and/or second controller 22 may have direct access to storage 20 and/or to search engine 62 and/or to data repository 64 and/or to a sort engine, reading the data from one or more locations according to the particular embodiment. It will be further apparent from FIG. 4 that search engine 62, data repository 64 and the sort engine have direct access to each other, such that any could access data on behalf of any other component according to the particular embodiment.

It will be readily apparent to those skilled in the art that one or more of the depicted individual components could be moved to a different device, situated locally or remotely, to, for example, support a remote data repository or have certain functions performed remotely.

As previously indicated, those skilled in the art will know or be able to ascertain using no more than routine experimentation, many equivalents to the illustrative embodiments and practices described herein. It will also be understood that the methods and systems described herein provide advantages over the prior art by automatically saving and recalling a user's search criteria, reducing the time and frustration associated with repeated searches. Accordingly, the scope of the invention should be determined not by the embodiments disclosed herein, but by the following claims, which are to be interpreted as broadly as allowed under the law.

Furthermore, it is to be understood that the terminology used herein is for the purpose of describing particular illustrative embodiments only and is not intended to be limiting. It must be noted that as used herein, including the appended claims, the singular forms "a," "an," and "the" include plural referents unless the context clearly dictates otherwise.

What is claimed is:

1. A quick search entry method for pre-filling search criteria into a search form based on search criteria provided in a prior search, the method comprising:

receiving a unique user identifier, receiving zero or more search criteria from the user, writing to a storage mechanism the search criteria such that it is associated with the identifer, and sending the search criteria for use by an Information Location Mechanism (ILM); then subsequently receiving a unique user identifier, receiving the unique user identifier, receiving a default search form, merging the search crieteria into the default search form, and sending the merged search form to the user;

whereby previous search sriteria is retrieved automatially, saving the user from having to remember exactly what search criteria was perviously entered, or from having to reenter that search criteria, or from having to eplicitly store and recall that search criteria.

2. A Quick Search Entry System (QSES) for pre-filling search criteria into a search form based on search criteria provided in a prior search, the QSES comprising:

a first indentification port configured to receive a unique user identifier;

a second identification port configured to receive a unique user identifier;

a data input port configured to receive zero or more search criteria;

a data output port configured to send search criteria to an Information Location Mechanism (ILM) and/or to the mechanism that invoked the QSES;

a storage mechanism configured to store search criteria by user identifier;

a form input configured to receive a default search form having a plurality of search entry fields;

a form output port configured to send a merged search form to the user;

a first controller configured to:

receive the identifier from the first identification port, receive the search criteria from the data input port, write to the storage mechanism the search criteria such that it is associated with the identifer, and send the search criteria to the data output port;

a second controller configured to;

receive the identifier from the second identification port;

receive the default search form from the form input port, merge the search criteria into the default search form, and send the merged search form to the form output port;

whereby search criteria stored by the first controller is retrieved automtically by the second controller, saving the user from having to remember exactly what search criteria was previously entered, or from having to reenter that search criteria, or from having to explicitly store and recall that search criteria.

3. The QSES recited in claim 2 wherein the second controller is condigured to send the default search form when no identifier is received or when there is no stored search criteria associated with the received identifer.

4. The QSES recited in claim 2 wherein the unique user identifer is derived from at least one of the following:

a Web "cookie",

HTTP authentication, a parameter in an HTML form, and/or

Windows NT authentication.

5. The QSES recited in claim 2 wherein the search form empolys a markup language including HTML, XML and/or SGML.

6. The QSES recited in claim 2 wherein the search form employs a portable document format.

7. The QSES recited in claim 2 wherein the search form empolys script and/or program code.

8. The QSES recited in claim 2 wherein the first identification port, the second identification port, the data input port, the data output port, the storage mechanism, the form input port, and/or the form ooutput port is/are coupled to an HTTP Web server, or coupled to a computer-readable media, or configured to communicate via a standard electronic messaging protocol.

9. The QSES recited in claim 2 wherein the ILM is a database management system, a search engine supporting full-text search, a search engine supporting fielded search, a search engine supporting regular expressions and/or other patterns, and/or an iterative search engine.

10. The QSES recited in claim 2 wherein the search form includes at least one search entry field for employment information.

11. The QSES recited in claim 2, further including a form selection port, and wherein the second controller is configured to read the selected form from the form input port.

12. The QSES recited in claim 2, further including:

an option port configured to receive an option from the user;

a second data output port configured to send search criteria for use by the ILM; and wherein the second controller is configured to, upon receipt of the option, bypass the search form and send the search criteria via the second data output port to the ILM, whereby the user saves additional time by receiving search results without interacting with a search form.

13. The QSES recited in claim 2, further including a form cache configured to store a copy of zero or more merged forms; and wherein the second controller is further configured to:

check if the data cache contains a merged form associated with the identifier;

if not, get a copy of the default form via the form input port, merge the search criteria into the default search form and store the merged form in the form cache;

send the merged form from the form cache to the form output port.

14. A search system comprising:

a QSES as recited in claim 2;

an ILM coupled to a data repository containing a plurality of data objects, the ILM being configured to receive the search criteria in a perdetermined syntax, search the data repository, and retrieve zero or more data objects that conform to the search criteria;

a formatting engine configured to format the search results from the ILM; and a client process and VDU to display the search form and the formatted search results.

15. The search system recited in claim 14 wherein the search form employs a markup language such as HTML, XML or SGML.

16. The search system recited in claim 14 wherein the contents of at least one data element of at least one data object include employment information.

17. The search system recited in claim 14, further including:

a sort port configured to receive sort criteria;

an Information Sorting Mechanism (ISM) coupled between the ILM and the formatting engine; the ISM being configured to receive the sort criteria in a predetermined syntax, receive a plurality of data objects from the ILM, sort the data objects according to the sort criteria, and forward the sorted data objects to the formatting engine.

* * * * *